R. C. CARPENTER & T. J. FLEMING.
PROCESS OF AND APPARATUS FOR PRODUCING DRAFT IN CEMENT KILNS AND SEPARATING DUST FROM THE WASTE GASES OF SUCH KILNS.
APPLICATION FILED JUNE 3, 1912.
1,078,254.
Patented Nov. 11, 1913.
2 SHEETS—SHEET 2.
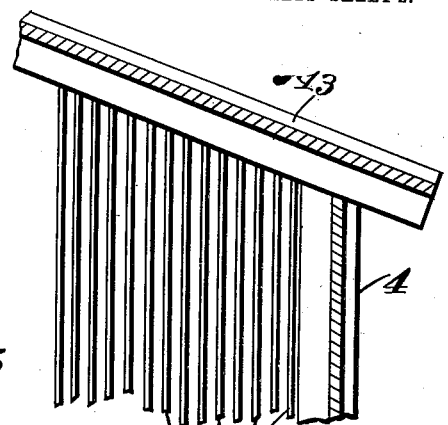
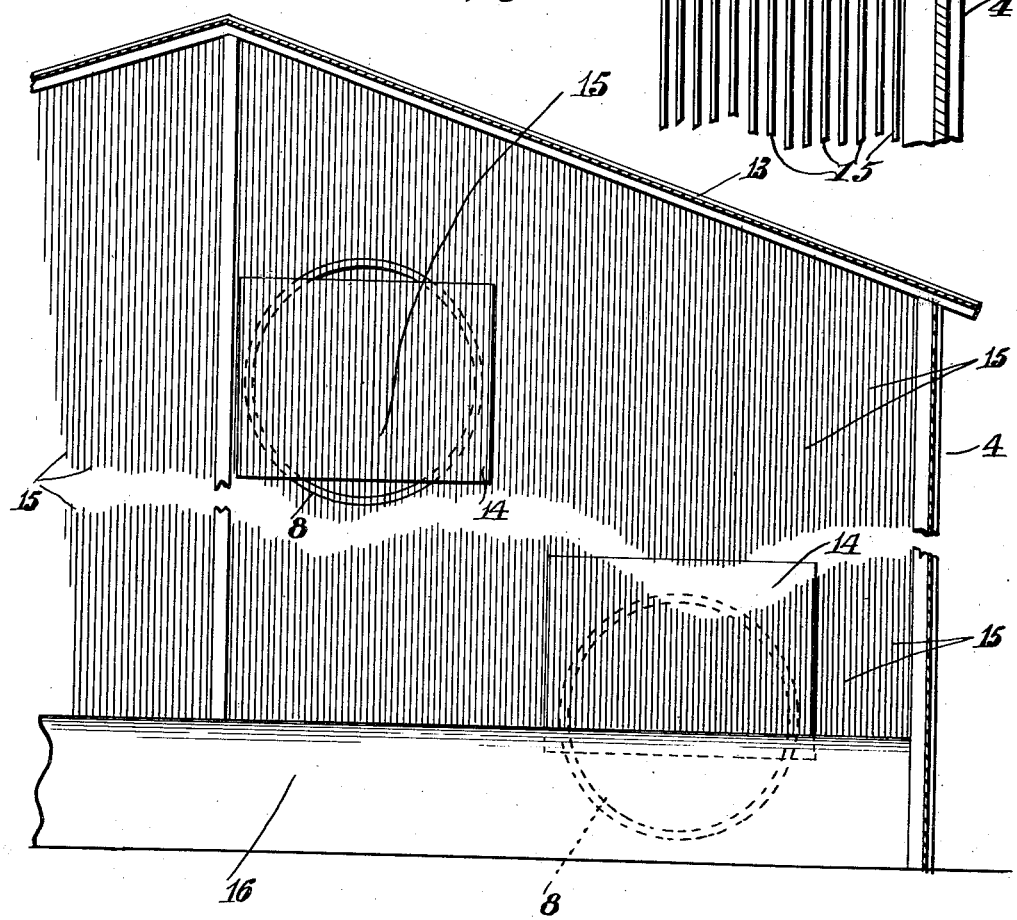

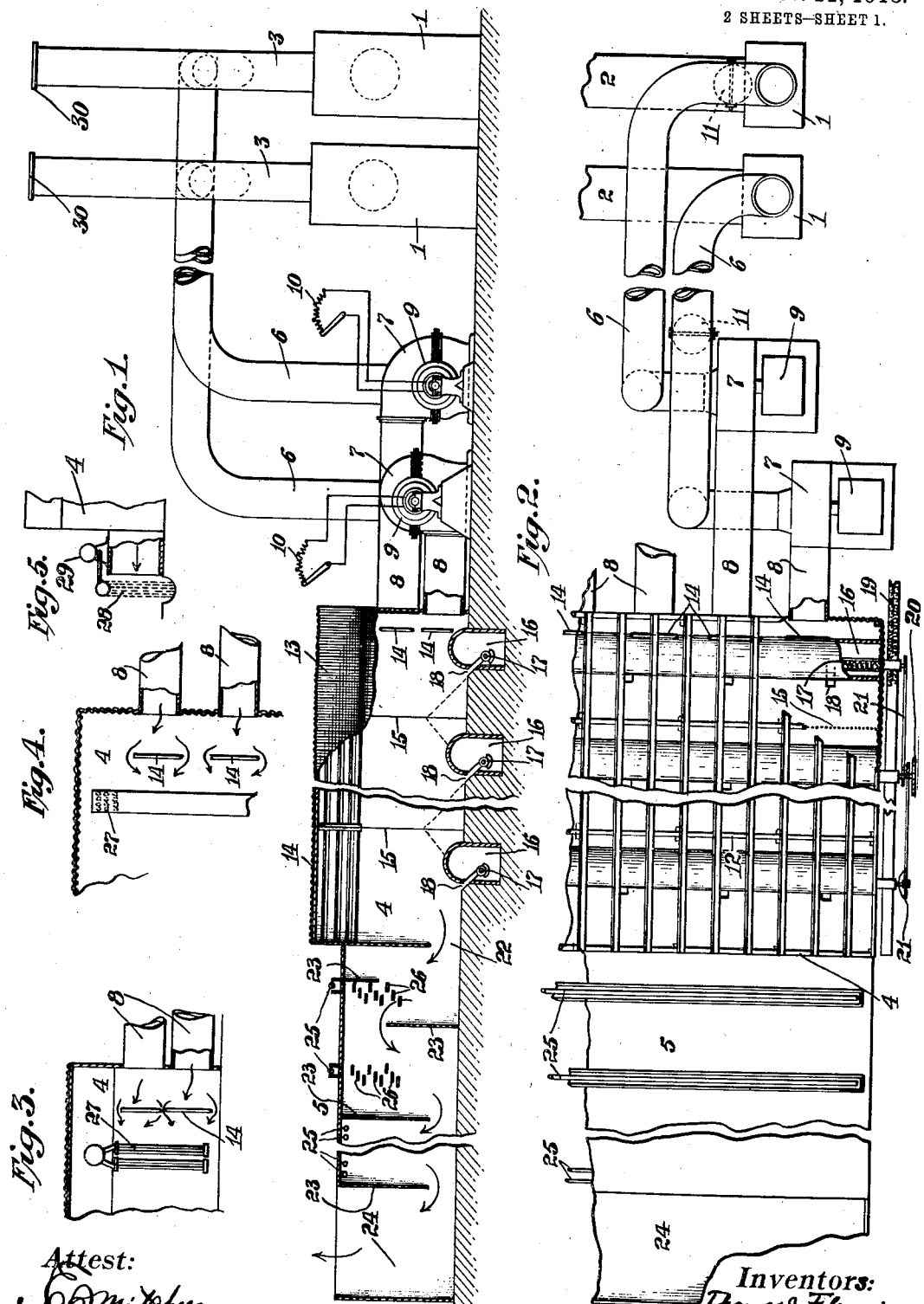

UNITED STATES PATENT OFFICE.

ROLLA C. CARPENTER, OF ITHACA, NEW YORK, AND THOMAS J. FLEMING, OF LOS ANGELES, CALIFORNIA; SAID CARPENTER ASSIGNOR TO SAID FLEMING.

PROCESS OF AND APPARATUS FOR PRODUCING DRAFT IN CEMENT-KILNS AND SEPARATING DUST FROM THE WASTE GASES OF SUCH KILNS.

1,078,254. Specification of Letters Patent. Patented Nov. 11, 1913.

Application filed June 3, 1912. Serial No. 701,395.

*To all whom it may concern:*

Be it known that we, ROLLA C. CARPENTER and THOMAS J. FLEMING, citizens of the United States of America, and residents, respectively, of Ithaca, county of Tompkins, and State of New York, and of Los Angeles, county of Los Angeles, and State of California, have invented a new and useful Process of and Apparatus for Producing Draft in Cement-Kilns and Separating Dust from the Waste Gases of Such Kilns, of which the following is a specification.

Our invention relates to an improved process of and apparatus for producing draft in cement kilns and separating dust from the waste gases of such kilns, and comprises, as a process, producing, in a kiln or kilns, and under normal cement kiln conditions, a dust-laden current of gases, and effecting separation of dust from such gases by passing such gases into a relatively spacious container, and therein spreading out the gases and cooling them and thereby greatly reducing their velocity; the gases being withdrawn from the kiln for such purification, preferably, by suction regulated to preserve normal draft conditions in the kiln; and as a process our invention further comprises further separation of dust from such gases by washing, after the primary gravital separation above referred to.

As an apparatus, our invention comprises one or more cement kilns, a dust separator or dust house comprising means for spreading out the dust laden gases, and for effecting dry separation of the dust therefrom by gravital action, and draft producing means arranged to withdraw dust laden gases from the said kiln or kilns by suction, and to discharge such gases into the said dust separator or dust house.

The objects of our invention are, to produce a practical and relatively inexpensive process of and apparatus for extracting dust from the waste gases of cement kilns, without interfering with the normal conditions of draft, heating, etc., which obtain in cement kilns as operated at present; to reduce to a negligible degree the dust carried by the gas current as it emerges from the separating apparatus; and to recover in usable form as great a proportion as practicable of the dust initially carried by the gases.

We will now proceed to describe our invention with reference to the accompanying drawings, and will then point out the novel features in claims.

In the drawings: Figure 1 shows more or less diagrammatically, and in partial vertical section, an elevation of our apparatus, comprising a plurality of cement kilns (which may be taken as representing generally sources of supply of hot dust-laden gases); primary and secondary dust houses adapted for the primary and secondary separation above mentioned; conduits connecting the said kilns with the primary dust house; and suction producing means interposed in such conduits. Fig. 2 shows a top view and partial horizontal section of the apparatus shown in Fig. 1. Fig. 3 shows a fragmentary vertical section of a portion of the primary dust house, illustrating the location of steam-generating coils or other heat transferring means in the dust house. Fig. 4 is a fragmentary horizontal section illustrating the parts shown in Fig. 3. Fig. 5 is a fragmentary elevation and partial section of the discharge portion of the dust house, indicating means for providing a water curtain across the discharge outlet of the dust house, for the washing of the gas. Fig. 6 is a fragmentary elevation of one of the dust separating grilles. Fig. 7 is a fragmentary detail of the view of Fig. 6 on a larger scale.

In the drawings, numerals 1 designate end housings of rotary cement kilns, and 2, 2 designate the rotary cement kilns themselves. It will be understood that the housings 1 are provided with usual means for feeding to the kilns the raw material, but as the kilns are indicated diagrammatically only, it is not deemed necessary to illustrate such feeding means. 3, 3 designate the stacks of such kilns.

4 designates the primary dust house, adapted for primary gravity separation of the major portion of the dust by the spreading out of the gases, and consequent reduction of velocity thereof, and by the cooling of the gases and consequent shrinkage thereof, and also by the action of grilles or the like; and 5 designates the secondary dust house, adapted for the secondary separation by washing or the like.

6, 6 designate conduits extending from the stacks 3, 3 to suction producing means (here indicated as rotary fans 7, 7) and 8, 8 designate further conduits, forming in substance continuations of the conduits 6, 6, and leading from the fans 7, 7 to the primary dust house 4.

Any suitable suction producing means may be employed, but suction fans are convenient; and as it may be desirable from time to time to vary the draft of the kilns, we have indicated, for such variation, electric motors 9, 9 driving the fans and controlled by rheostats 10, 10; also dampers 11, 11 in conduits 6, 6. It will be understood, however, that any other suitable means for regulation of draft may be employed.

The primary dust house, 4, should be of a size, proportionate to the volume and initial velocity of the gases to be treated, sufficient so that the velocity of the gases passing through such primary dust house 4, is, during their passage through such primary dust house, reduced to a relatively low figure, through the spreading out of these gas currents in the relatively capacious primary dust house 4, and otherwise. It is further desirable that the walls of the primary dust house should be composed of material having a high rate of heat conductivity and a large radiating surface, so that the gases may be greatly reduced in temperature by radiation of heat, during their passage through this primary dust house. This cooling by radiation is extremely important, as by such cooling the volume of the gases is greatly reduced, and their density greatly increased, which in turn permits the primary dust house 4 to be much smaller than it would otherwise have to be for equally effective separation. It is further desirable that this primary dust house shall be formed of metal, in order that the structure of the dust house may expand and contract freely with the considerable changes of temperature to which it is subjected from time to time. In the drawings we have indicated the dust house as composed of a metallic frame-work 12, with corrugated iron walls and roof 13. To diffuse the entering gases widely, immediately upon their entrance to the dust house, suitable baffles 14 are provided within the primary dust house 4, and immediately in front of the orifices of conduit 8. To further facilitate the settling of the dust within the primary dust house, suitable grilles 15 are provided at intervals, across the dust house; and, in the floor of the dust house, suitable tunnels 16 are provided, within which tunnels are located screw conveyers or other suitable conveyers, 17, connected by chutes 18 within the interior of the dust house, through which chutes the dust, as it collects on the floor of the dust house, will pass to the conveyers, and thence will be discharged upon a suitable conveying belt 19, or other suitable conveying means, whereby the dust so discharged by the conveyers may be carried away. We have indicated in the drawings a drive wheel 20 for the shaft of one of the conveyers and other drive chains 21 extending from such shaft to the shafts of the other conveyers.

We have found that grilles 15 consisting of vertical wires or rods spaced apart suitable distances are particularly effective in causing the settling of dust; and we have found that the dust collects around such grilles in heaps, as indicated in dotted lines in Fig. 1. These grilles behave quite differently than do screens; screens, similarly placed, would be apt to clog with dust, whereas grilles such as described do not clog, but deposit their dust readily. In practice we have used for these grilles No. 10 or No. 12 wire rods spaced about two inches apart.

The primary dust house 4 communicates, at its rear end, with the secondary dust house 5, through a discharge opening 22. The interior of this secondary dust house 5 is divided by a plurality of baffles 23 extending alternately downward from the top and upward from the bottom of such secondary dust house, whereby the gases in passing through this secondary dust house 5 are caused to follow a tortuous path as indicated by arrows in Fig. 1; and the gases finally emerge from a discharge chamber 24. In this secondary dust house suitable means are provided for washing the gases by means of water sprays or other suitable means; for which purpose we have indicated spray pipes 25 and baffles 26 beneath certain of the spray pipes, whereby the water discharged from the spray pipes into the secondary separating chamber 5 is caused to drip from one baffle to another, thus increasing the effectiveness of the baffles.

It is well known that cement kilns discharge large quantities of dust, with the gases escaping from such kilns, and that the collection of this dust is extremely desirable, partly because it is in itself perfectly good cement forming material and partly because the dust is itself objectionable in many cases; and it is also well known that the temperature at which this dust is so discharged is so high as to make impracticable the filtering out of the dust through cloth screens or the like such as are employed in many arts for extracting dust from dust laden gases. But the efficient separation of the dust from the stack gases of cement kilns has heretofore been found to be extremely difficult. Attempts have been made to free the stack gases of cement kilns from dust by means of washers interposed between the kiln stacks and suction producing means; but this has been found substantially impracticable, in that the draft of the kilns is greatly reduced, by such washers, and consequently the output of the kilns is greatly reduced; also it has been found, with washers so located, that it is extremely difficult to regulate as desired the draft of the kilns. We have found that these difficulties are obviated by placing the dust separating apparatus, not between the kilns and the suction producing means, but on beyond the suction producing means; and we have found that by means of a dust separating apparatus such as herein illustrated and described, and embodying primary gravity separation of the dust facilitated by spreading out the gases and reducing their velocity, and by cooling the gases, coupled with a secondary separation of the greater portion of the remaining dust, by washing, the proportion of dust in the gases which finally emerge from the dust separating apparatus is so small as to be negligible. In one particular case, where the original discharge of dust, before dust separating apparatus such as herein described was installed, amounted to approximately twenty two tons per day, after the installation of dust separating apparatus as herein described, the dust discharged with the gases escaping from the dust house amounted to only two hundred pounds per day; an amount which was judicially determined to be negligible. In this apparatus the velocity of the gases was reduced, in the primary dust house, from about fifteen feet per second to about one foot per second.

In the secondary dust house, the vertical baffles not only create a tortuous path for the flow of the gas currents but produce eddies in such currents, thereby delaying the flow of the gas currents and giving further opportunity for the action of the water sprays on the dust. The action of the water causes the dust to gather in small masses and to precipitate.

By far the greater portion of the dust is separated out in the primary dust house in a dry condition, and, being removed by the conveyers, is mixed with the raw material to be charged into the kilns. This recovery of the greater portion of the dust in a condition available for its return to the kilns as raw material is, from an economic point of view, an important feature of the invention, since it materially reduces the amount of raw material required for the production of a given amount of cement.

In some cases, and as indicated particularly in Figs. 3 and 4, we provide cooling pipes 27 in the initial portion of the primary dust house and in the path of the gases flowing through such primary dust house, and supply water to these cooling pipes. These pipes not only cool the entering gas current greatly, but also utilize a large portion of the heat in such gases in the generation of steam, which steam may be used for the operation of the machinery of the plant. These pipes retard mechanically the flow of the gases, so facilitating the deposit of the dust.

In some cases, and as illustrated in Fig. 5, we pass the gases discharged from the dust house through a water curtain 28 derived from a water supply pipe 29; the water curtain removing substantially all of the dust still carried by the gases after their passage through the dust house. In many cases this water curtain renders a secondary dust house unnecessary.

Covers 30 are provided for the stacks 3 of the cement kilns.

In another application for Letters Patent, filed July 22, 1913, Sr. No. 780,553, we have claimed the combination with a rotary inclined cement kiln of positive variable regulable or adjustable draft producing and draft controlling means connected with the upper end of the kiln and controlling draft conditions through the kiln independent of atmospheric conditions; also, the process which comprises positively and regulably withdrawing the gaseous products of operation of such kiln independently of natural or atmospheric draft conditions; that is to say, in the said application Sr. No. 780,553 we have claimed the combination of the kiln and suction fan connected to the upper end of the kiln, irrespective of the dust separator, also the process of draft production and control effected by such combination. These inventions being claimed in another application, are not claimed herein.

What we claim is:—

1. The herein described method of separating dust from the hot waste gases of cement kilns which comprises producing a dust laden current of gases under normal cement kiln conditions, reducing greatly the velocity and temperature of such gases without interfering with such normal conditions and effecting a primary separation therefrom of a major portion of the dust by gravity action, and then separating substantially all of the remaining dust from the cooled and partly purified gas by washing.

2. The herein described method of producing draft in cement kilns and separating dust from the waste gases of such kilns, which consists in withdrawing the waste gases laden with dust from the kiln by a suction regulated to preserve normal draft conditions in said kiln and forcing such gases into a relatively spacious container; and therein spreading out the gases and cooling them and thereby greatly reducing their velocity and effecting a separation of the dust from such gases by gravity action.

3. The herein described method of producing draft in cement kilns and separating dust from the waste gases of such kilns, which consists in withdrawing the waste gases laden with dust from the kiln by suction, forcing such gases into a relatively spacious container, and therein spreading out the gases and cooling them and thereby greatly reducing their velocity, whereby a primary separation of the major portion of the dust from such gases by gravity action is effected and then separating substantially all of the remaining dust from the cooled gases by washing.

4. The combination with a cement kiln, of a dust separator, and draft producing means arranged to withdraw by suction dust laden gases from the off-take of said kiln and to discharge the same into said dust separator, said dust separator comprising means for spreading out the dust laden gases discharged thereinto and for effecting a dry separation of the dust therefrom by gravity.

5. The combination with a cement kiln, of a dust separator, and draft producing means arranged to withdraw by suction dust laden gases from the off-take of said kiln and to discharge the same into said dust separator, said dust separator comprising means for spreading out and for cooling the dust laden gases discharged thereinto and for effecting a primary dry separation of the dust therefrom by gravity, and also comprising means for effecting a further separation of the dust from the cooled gases by washing.

In testimony whereof we have signed this specification each in the presence of two subscribing witnesses.

ROLLA C. CARPENTER.
THOMAS J. FLEMING.

Witnesses for Rolla C. Carpenter:
D. A. DAVIES,
H. M. MARBLE.

Witnesses for Thomas J. Fleming:
J. P. CHANDLER,
C. D. COLLOM.